US012792527B2

(12) United States Patent
Dai

(10) Patent No.: US 12,792,527 B2
(45) Date of Patent: Nov. 10, 2026

(54) METHOD AND APPARATUS FOR ACQUIRING DEVICE INFORMATION, STORAGE MEDIUM AND ELECTRONIC DEVICE

(71) Applicant: VirtAI Technologies (Beijing) Co., Ltd., Beijing (CN)

(72) Inventor: Guohao Dai, Beijing (CN)

(73) Assignee: Beijing VirtAI Intelligent Technologies Company Limited, Beijing (CN)

( * ) Notice: Subject to any disclaimer, the term of this patent is extended or adjusted under 35 U.S.C. 154(b) by 1264 days.

(21) Appl. No.: 17/620,522

(22) PCT Filed: Jun. 10, 2020

(86) PCT No.: PCT/CN2020/095376
§ 371 (c)(1),
(2) Date: Dec. 17, 2021

(87) PCT Pub. No.: WO2020/259286
PCT Pub. Date: Dec. 30, 2020

(65) Prior Publication Data

US 2022/0358055 A1 Nov. 10, 2022

(30) Foreign Application Priority Data

Jun. 24, 2019 (CN) ......................... 201910551370.7

(51) Int. Cl.
*G06F 13/10* (2006.01)
*G06F 9/44* (2018.01)
*G06F 11/00* (2006.01)

(52) U.S. Cl.
CPC .............. *G06F 13/107* (2013.01); *G06F 9/44* (2013.01); *G06F 11/00* (2013.01); *G06F 11/004* (2013.01); *G06F 13/10* (2013.01); *G06F 13/102* (2013.01)

(58) Field of Classification Search
CPC ........ G06F 13/107; G06F 13/102; G06F 9/44; G06F 11/00; G06F 13/10; G06F 11/004
See application file for complete search history.

(56) References Cited

U.S. PATENT DOCUMENTS 8,473,650 B1 * 6/2013 Matessa ................ G06F 13/385 710/62
2005/0132092 A1 * 6/2005 Mylly .................. G06F 9/4411 710/8

(Continued)

FOREIGN PATENT DOCUMENTS

CN 104092715 A 10/2014
CN 107003952 A 8/2017

(Continued)

OTHER PUBLICATIONS

International Search Report from corresponding International Application No. PCT/CN2020/095376, mailed on Sep. 16, 2021, 4 pages.

*Primary Examiner* — Omar F Fernandez Rivas
(74) *Attorney, Agent, or Firm* — Tucker Ellis LLP

(57) ABSTRACT

The present disclosure relates to a method and apparatus for acquiring device information, a storage medium and an electronic device, so as to ensure normal running of an application program in a computer system. The method is applied to a first terminal, an application program in the first terminal communicates with a peripheral in a second terminal through a device call interface. The method includes: determining, in response to reception of a device query request, a target peripheral in the first terminal according to a preset rule, where the device query request is used for querying device information of the peripheral in the second terminal; acquiring device information of the target peripheral; and sending the device information of the target peripheral to the application program.

12 Claims, 7 Drawing Sheets

(56) References Cited

U.S. PATENT DOCUMENTS

| | | | | |
|---|---|---|---|---|
| 2006/0004554 | A1* | 1/2006 | Vega | G06F 9/45558 703/6 |
| 2007/0011446 | A1* | 1/2007 | Kato | H04L 63/08 713/150 |
| 2007/0174033 | A1* | 7/2007 | Huang | G06F 13/105 703/24 |
| 2007/0198996 | A1* | 8/2007 | Chiu | G06F 9/4411 719/321 |
| 2008/0077712 | A1* | 3/2008 | Saito | G06F 3/0607 710/8 |
| 2016/0232114 | A1 | 8/2016 | Lo et al. | |

FOREIGN PATENT DOCUMENTS

| | | | | |
|---|---|---|---|---|
| CN | 107077377 | A | | 8/2017 |
| CN | 107426414 | A | | 12/2017 |
| CN | 107846466 | A | | 3/2018 |
| CN | 109144603 | A | | 1/2019 |
| JP | 2013084190 | A | * | 5/2013 |
| KR | 20180096937 | A | * | 8/2018 |
| WO | 2018072101 | A1 | | 4/2018 |

* cited by examiner

METHOD AND APPARATUS FOR ACQUIRING DEVICE INFORMATION, STORAGE MEDIUM AND ELECTRONIC DEVICE

CROSS-REFERENCE TO RELATED APPLICATIONS

The present disclosure is a U.S. national phase of International Patent Application Serial No. PCT/CN2020/095376 filed on Jun. 10, 2020, which claims the benefit of Chinese Patent Application No. 201910551370.7 filed on Jun. 24, 2019, the contents of the which are incorporated by reference in their entireties.

TECHNICAL FIELD

The present disclosure relates to the field of computer technology, in particularly, to a method and apparatus for acquiring device information, a storage medium and an electronic device.

BACKGROUND

In the computer system, in order to improve the performance of the application program, when performing computation tasks, firstly, information such as bus address, device address, etc. of the device in the computer system is acquired through device call interface, device distribution information between the device and all the central processing units (CPUs) in the computer is queried through operating system interface, and then the CPU with the minimum communication distance to the device is determined according to the obtained device distribution information to perform the computation task, so as to improve computation efficiency.

However, in the related art, application program of computer A can call, through remote device call interface, peripherals in computer B for auxiliary computation. In this situation, information such as bus address, device address, etc. queried by computer A through device call interface are device information of the device in computer B. In this way, in the case of querying the device distribution information between the device and all the CPUs in computer A through the operating system interface of computer A, the corresponding device distribution information cannot be queried since the device does not exist in computer A, which will be accordingly considered as an execution error by the application program, and the operation of the application program will be stopped.

SUMMARY

The objective of the present disclosure is to provide a method and apparatus for acquiring device information, a storage medium and an electronic device, so as to ensure normal running of application programs in a computer system.

In order to achieve the above objective, in a first aspect, the present disclosure provides a method for acquiring device information. The method is applied to a first terminal, an application program in the first terminal communicates with a peripheral in a second terminal through device call interface, and the method includes:

determining, in response to reception of a device query request, a target peripheral in the first terminal according to a preset rule, and the device query request is used for querying device information of the peripheral in the second terminal;

acquiring device information of the target peripheral; and sending the device information of the target peripheral to the application program.

In a second aspect, the present disclosure further provides an apparatus for acquiring device information. The apparatus is applied to a first terminal, and an application program in the first terminal communicates with a peripheral in a second terminal through device call interface. The apparatus includes:

a determination module, configured to determine, in response to reception of a device query request, a target peripheral in the first terminal according to a preset rule, and the device query request is used for querying device information of the peripheral in the second terminal;

an acquisition module, configured to acquire device information of the target peripheral; and a sending module, configured to send the device information of the target peripheral to the application program.

In a third aspect, the present disclosure further provides a computer-readable storage medium storing a computer program thereon, and the steps of any one of the method in the first aspect are implemented when the program is executed by a processor.

In a fourth aspect, the present disclosure further provides an electronic device. The electronic device includes:

a memory storing a computer program thereon; and a processor configured to execute the computer program in the memory, so as to implement steps of any one of the method in the first aspect.

By means of the above technical solution, in the case of the application program in the first terminal is in telecommunication with the peripheral in the second terminal through the device call interface, the target peripheral may be determined, in response to reception of a device query request for querying the device information of the peripheral in the second terminal, in the first terminal according to the preset rule, then the device information of the target peripheral is acquired, and the device information of the target peripheral is sent to the application program. By means of the method of the present disclosure, since the device information of the target peripheral in the first terminal is returned to the application program, the application program may query corresponding device distribution information when querying the device distribution information through operating system interface, avoiding an execution error of the application program, and ensuring the normal running of the application program.

Other features and advantages of the present disclosure will be illustrated in detail in the detailed description that follows.

BRIEF DESCRIPTION OF DRAWINGS

The drawings are used for providing further understanding of the present disclosure and constitute a part of the specification, together with the specific implementations below serve to explain the present disclosure, but are not intended to be construed as a limitation to the present disclosure. In the drawings.

DETAILED DESCRIPTION

Specific implementations of the present disclosure are described in detail below with reference to the drawings. It should be understood that the specific implementations described herein are merely used for illustrating and explaining the present disclosure and are not intended to limit the present disclosure.

Figure 1:
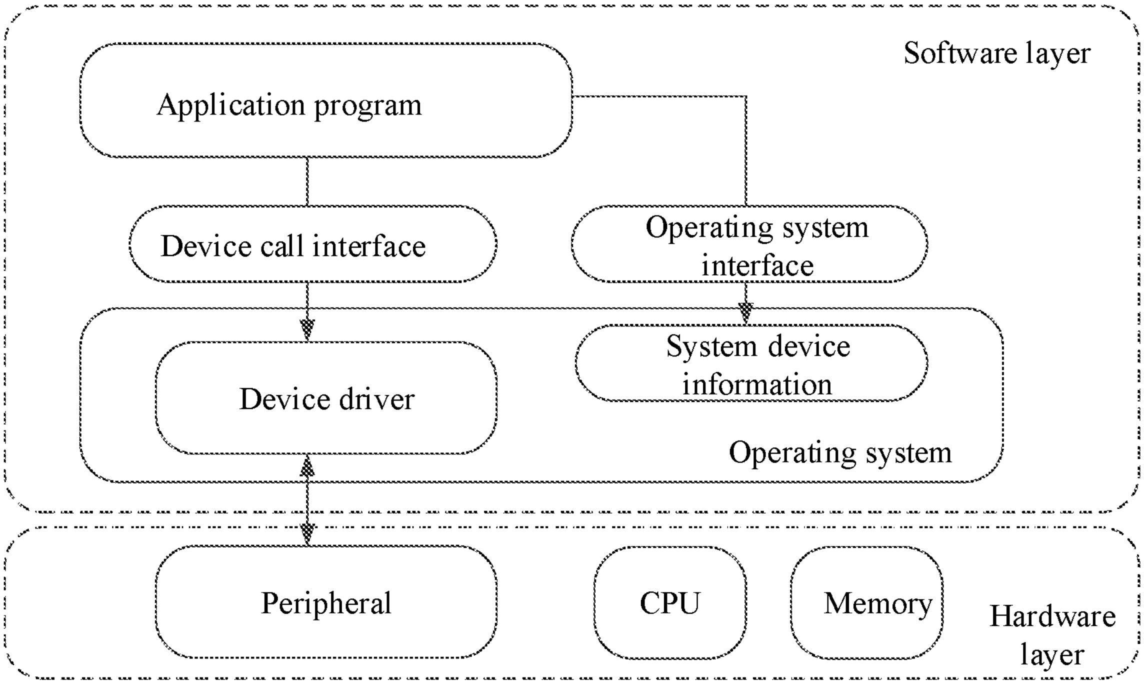
FIG. 1 is a structural schematic diagram of a computer system in the related art.

Firstly, the technical background involved in the examples of the present disclosure is introduced. As shown in FIG. 1, an application program in a computer may call a peripheral, for example, peripheral component interconnect (PCI) devices such as graphics processing unit (GPU), etc., to execute a computation task. A provider of these peripherals generally provides a device driver and a device call interface for the application program to use corresponding peripheral, and information such as bus address, device address, etc. of a PCI device in a computer system may be queried through the device call interface.

Except for calling the peripheral for auxiliary computation, in order to obtain better performance, the application program further may query information such as bus addresses, device addresses, etc. of all central processing units (CPUs) in the computer system through operating system interface, and then selects the CPU with the minimum communication distance to the device to execute the computation task. Distribution information of various devices inside this type of computer system is generally maintained by an operating system, and is accessible by various application programs through the operating system interface. That is, the application program may query the device distribution information between the device and all the CPUs in the computer system through the operating system interface.

In the computer system, in order to improve performance of the application program, when performing the computation tasks, firstly, the information such as bus address, device address, etc. of the device in the computer system may be acquired through the device call interface, the device distribution information between the device and all the CPUs in the computer is queried through the operating system interface, and then the CPU with the minimum communication distance to the device is determined according to the device distribution information obtained above, so as to perform the computation task and to improve computation efficiency.

Figure 2:
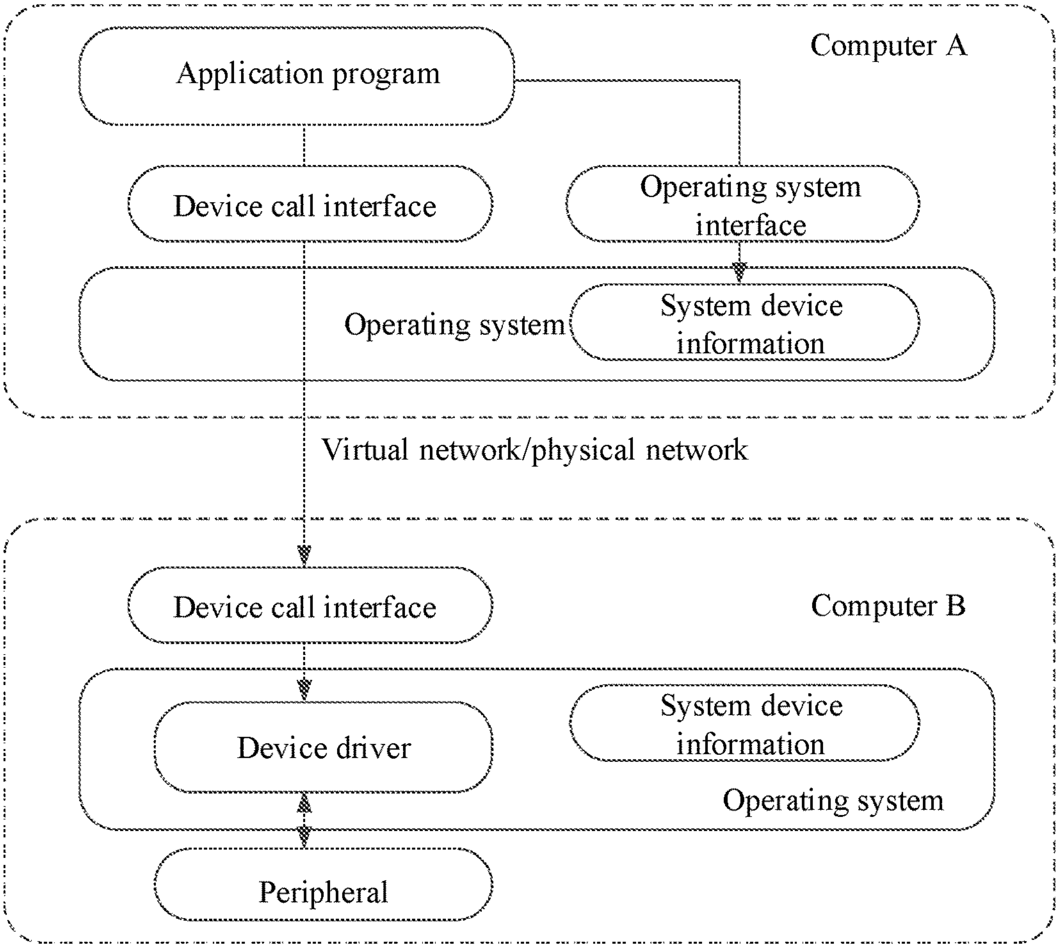
FIG. 2 is a schematic diagram of telecommunication of two computers in the computer system in the related art.

However, as shown in FIG. 2, in the related art, an application program of a computer A may remotely call a peripheral in a computer B for auxiliary computation through a device call interface, and the application program does not need to sense whether a remote device or a local device is called, for example, an application of running a nonvolatile memory express (NVMe) protocol on networks of an Internet wide area remote direct memory access (RDMA) protocol (iWarp), RDMA over converged Ethernet (ROCE), Infiniband, a fiber channel (FC), an Omni-path, etc., that is, NVMe over fabric, is such an application program of remote storage.

In the above scene of using the remote device, the information such as the bus address, the device address, etc. obtained by the computer A through the device call interface is device information of the device in the computer B. Since the device does not exist in the computer A, the corresponding device distribution information may not be queried when the device distribution information between the device and all the CPUs in the computer A is queried through the operating system interface of the computer A, which may be accordingly considered as an execution error by the application program, and operation of the application program is stopped.

In order to solve the above technical problem, the example of the present disclosure may provide a method and apparatus for acquiring device information, a storage medium and an electronic device, so as to enable a computer to query the corresponding device distribution information in the scene of using the remote device, avoiding the execution error of the application program and ensuring normal running of the application program.

Firstly, the example of the present disclosure provides a method for acquiring device information. The method may be applied to a first terminal, and an application program in the first terminal may communicate with a peripheral in a second terminal through a device call interface. The first terminal and the second terminal may be different terminals such as a physical computer, a virtual computer, etc., which is not limited by the example of the present disclosure.

Figure 3:
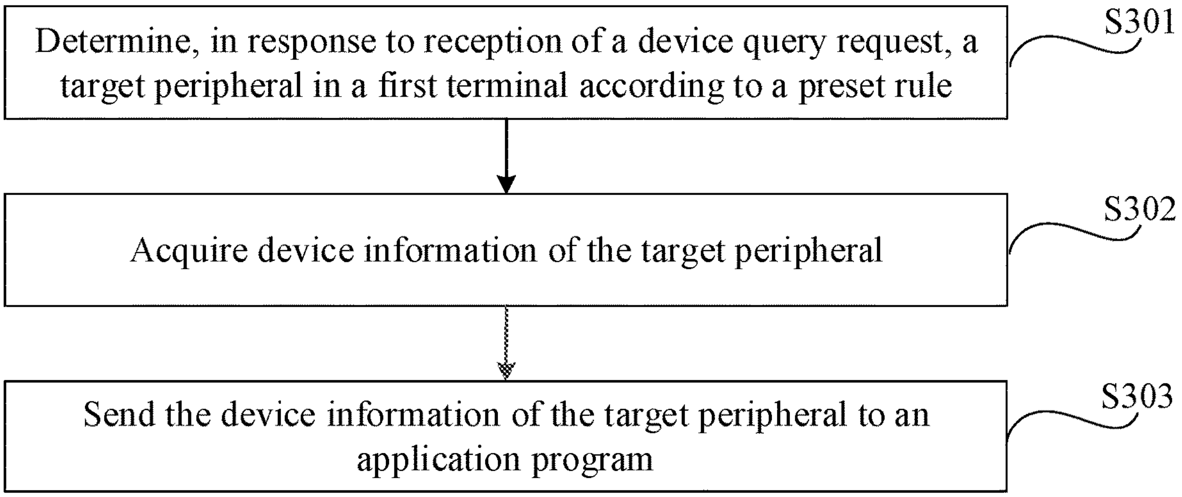
FIG. 3 is a flowchart of a method for acquiring device information shown in one example of the present disclosure.

FIG. 3 is a flowchart of a method for acquiring device information shown in one example of the present disclosure. With reference to FIG. 3, the method may include:

S301, a target peripheral is determined, in response to reception of a device query request, in a first terminal according to a preset rule. The device query request is used for querying device information of a peripheral in a second terminal.

In one example, the device information in the example of the present disclosure may include static information and dynamic information of a device. The static information may be information that the device remains unchanged in different computer systems, for example, a model number, a version number, etc. of the device. The dynamic information may be information that the device may be changed in different computer systems, for example, a bus address, a device address, etc. of the device. It should be understood that the example of the present disclosure does not limit specific content of the device information.

S302, device information of the target peripheral is acquired.

S303, the device information of the target peripheral is sent to an application program.

That is, in the case of the application program of the first terminal executes a computation task and needs the peripheral in the second terminal to perform auxiliary computation, a control module in the first terminal may trigger to generate the device query request for querying the device information of the device in the second terminal. The control module in the first terminal may send the device query request to a device call interface of the first terminal. After the device call interface receives the device query request, the target peripheral may be determined in the first terminal according to the preset rule, that is, the target peripheral is determined from existing peripherals in the first terminal, such that in a subsequent process of device information query, since the target peripheral is the existing peripheral in the first terminal, corresponding device distribution information may be queried, avoiding an execution error of the application program and ensuring normal running of the application program.

Figure 4:
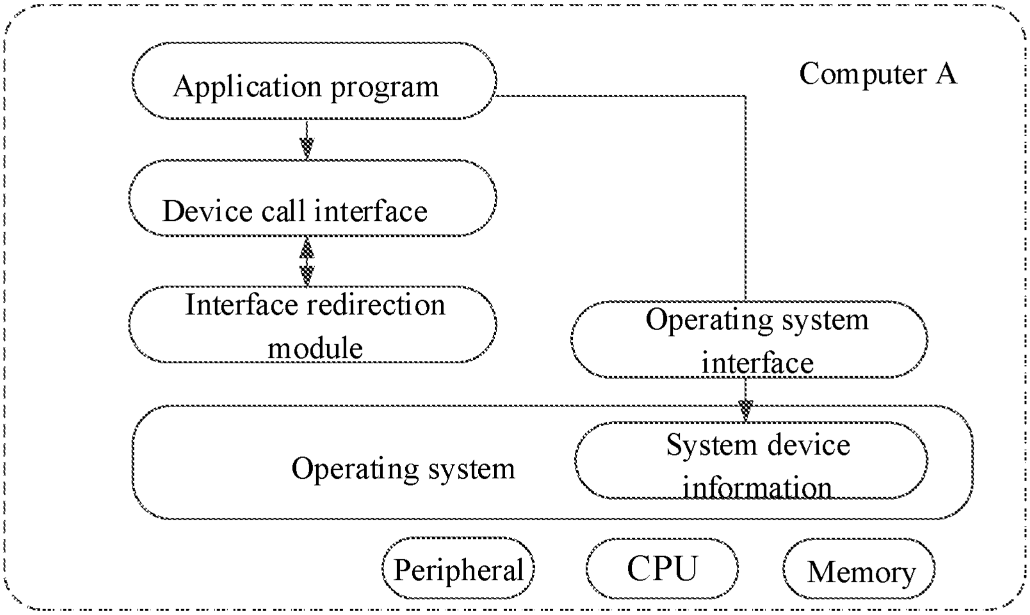
FIG. 4 is a structural schematic diagram of a first terminal shown in one example of the present disclosure.

In one possible implementation, in order to implement the above method for acquiring device information, with reference to FIG. 4, the first terminal is illustrated with a computer A, and the computer A may be a virtual computer or a physical computer, which is not limited by the example of the present disclosure. With reference to FIG. 4, an interface redirection module may be added into the computer A, may communicate with the device call interface, and is used for determining the target peripheral in the first terminal according to the preset rule after the device call interface receives the device query request, and returning the device information of the target peripheral to the device call interface, such that the device call interface may return the device information of the target peripheral to the application program, avoiding the execution error of the application program, and ensuring normal running of the application program.

In order to enable those skilled in the art to better understand the method for acquiring device information in the example of the present disclosure, each above step is illustrated below.

In the specific implementation of the present disclosure, the first terminal may be a physical computer or a virtual computer, that is, the method for acquiring device information in the present disclosure may be applied to a virtualized scene or a non-virtualized scene. For different application scenes, the implementation of determining the target peripheral in the first terminal according to the preset rule in S301 may be different.

In one possible implementation, the query request may include type information of the peripheral in the second terminal, and the type information may be used for representing device type of the peripheral in the second terminal. In one example, the type information may be static information of the device, that is, the type information will not change in different computer systems, and the static information may be various information such as manufacturer identifier, model number, etc. of the device, which is not limited by the example of the present disclosure.

Since the query request includes the type information of the peripheral in the second terminal, the device type of the peripheral in the second terminal may be obtained by analyzing the query request, such that the target peripheral with the same device type as the peripheral in the second terminal may be determined in the first terminal. For example, it is determined that the device type of the peripheral in the second terminal is a game graphics card by analyzing the query request, then a peripheral that is also the game graphics card may be determined as the target peripheral in the first terminal.

It should be understood that the target peripheral with the similar device type to the second terminal may be determined in the first terminal under the condition that the target peripheral with the same device type as the peripheral in the second terminal is not found in the first terminal, that is, any peripheral may be determined as the target peripheral in the first terminal. For some application scenes, the application program only needs to query address information of the device in the first terminal, that is, it only needs to ensure that the address information of the device may be found in the first terminal, so it is feasible to determine the target peripheral similar to the peripheral in the second terminal.

By means of the above manner, both in the virtualized scene and the non-virtualized scene, the target peripheral with the same device type as or the similar device type to the peripheral in the second terminal may be determined in the first terminal by the type information of the peripheral in the second terminal included in the query request. In this way, when the application program queries the device distribution information through operating system interface, the corresponding device distribution information may be queried, avoiding the execution error of the application program and ensuring normal running of the application program.

In another possible implementation, the first terminal is a virtual terminal, and may be in communication connection with the device call interface of the second terminal, such that in S301, the device call interface of the second terminal may be controlled to acquire the device information of the peripheral in the second terminal firstly, and then according to the device information of the peripheral in the second terminal, a virtual peripheral that is the same as the peripheral is added into the first terminal, and the virtual peripheral is taken as the target peripheral under the condition that the virtual peripheral that is the same as the peripheral is successfully added into the first terminal.

Figure 5:
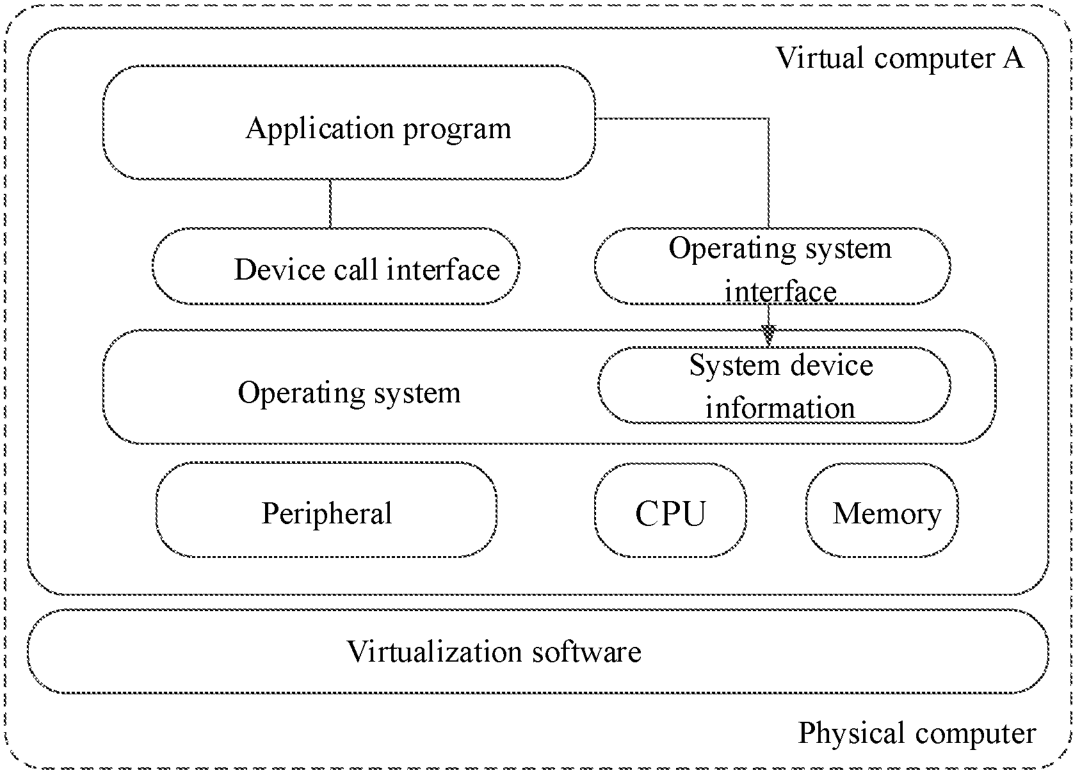
FIG. 5 is a structural schematic diagram of a virtual computer in the related art.

Due to a rise of cloud computing, the first terminal may be a virtual machine running on a cloud or a data center physical machine, for example, a virtual computer A shown in FIG. 5. All hardwares inside the virtual computer A, including a peripheral, a CPU, a memory, etc., are virtualized by means of virtualization software running on the physical computer. These virtual peripherals are detected by an operating system inside the virtual computer A, are put into system device information, and are accessible by an application program on the virtual computer A through the operating system interface. Moreover, the virtualization software may provide some control interfaces to add the peripheral into the virtual machine statically or dynamically. The operating system may also find the newly-added peripheral dynamically and updates the system device information at any time.

Accordingly, in the example of the present disclosure, in the scene that the first terminal is the virtual terminal, the first terminal may be in communication connection with the device call interface of the second terminal, and the device call interface of the second terminal may be controlled to acquire the device information of the peripheral in the second terminal, and then according to the device information of the peripheral in the second terminal, the virtual peripheral that is the same as the peripheral is added into the first terminal. It should be understood that the virtual peripheral that is the same as the peripheral in the second terminal described in the example of the present disclosure may be a virtual peripheral with the same type as the peripheral in the second terminal. For example, the peripheral in the second terminal is a GPU, so the virtual peripheral that is also the GPU may be added into the first terminal.

Figure 6:
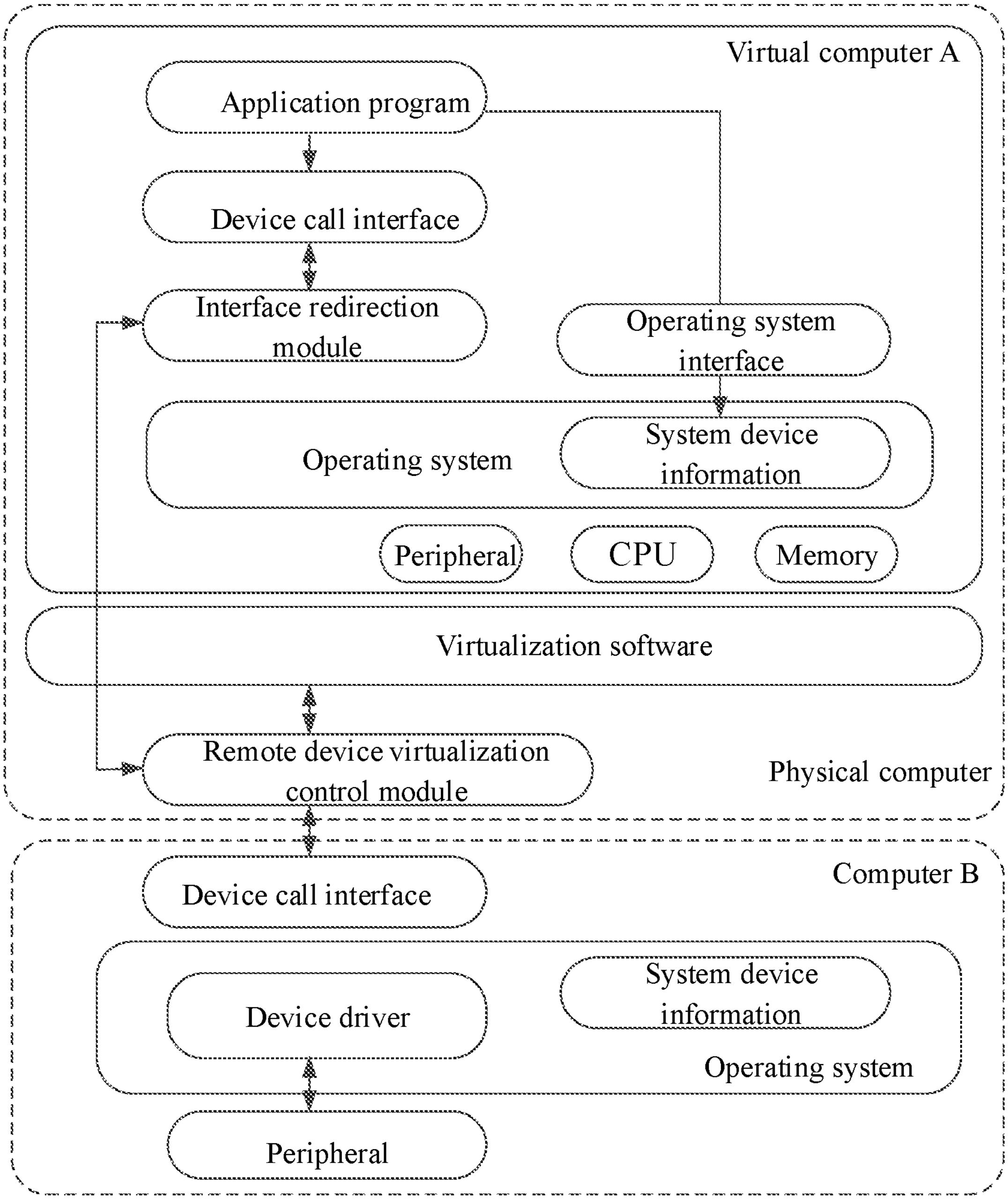
FIG. 6 is a structural schematic diagram of the first terminal and a second terminal shown in one example of the present disclosure.

In one possible situation, in order to achieve the above technical solution, with reference to FIG. 6, an interface redirection module and a remote device virtualization control module may be added into a virtual computer A (first terminal). The interface redirection module may communicate with the device call interface and the remote device virtualization control module, may intercept a query operation executed by the device call interface according to the device query request, and sends all information corresponding to the query operation to the remote device virtualization control module. On the other hand, the interface redirection module may also receive the information sent by the remote device virtualization control module and send the information to the device call interface.

With further reference to FIG. 6, the remote device virtualization control module may communicate with the device call interface of the computer B (second terminal) and communicates with the virtualization software of the physical computer through virtualization software interface to add a new peripheral into the virtual computer A by means of the virtualization software according to the device information returned by the device call interface of the computer B.

Figure 7:
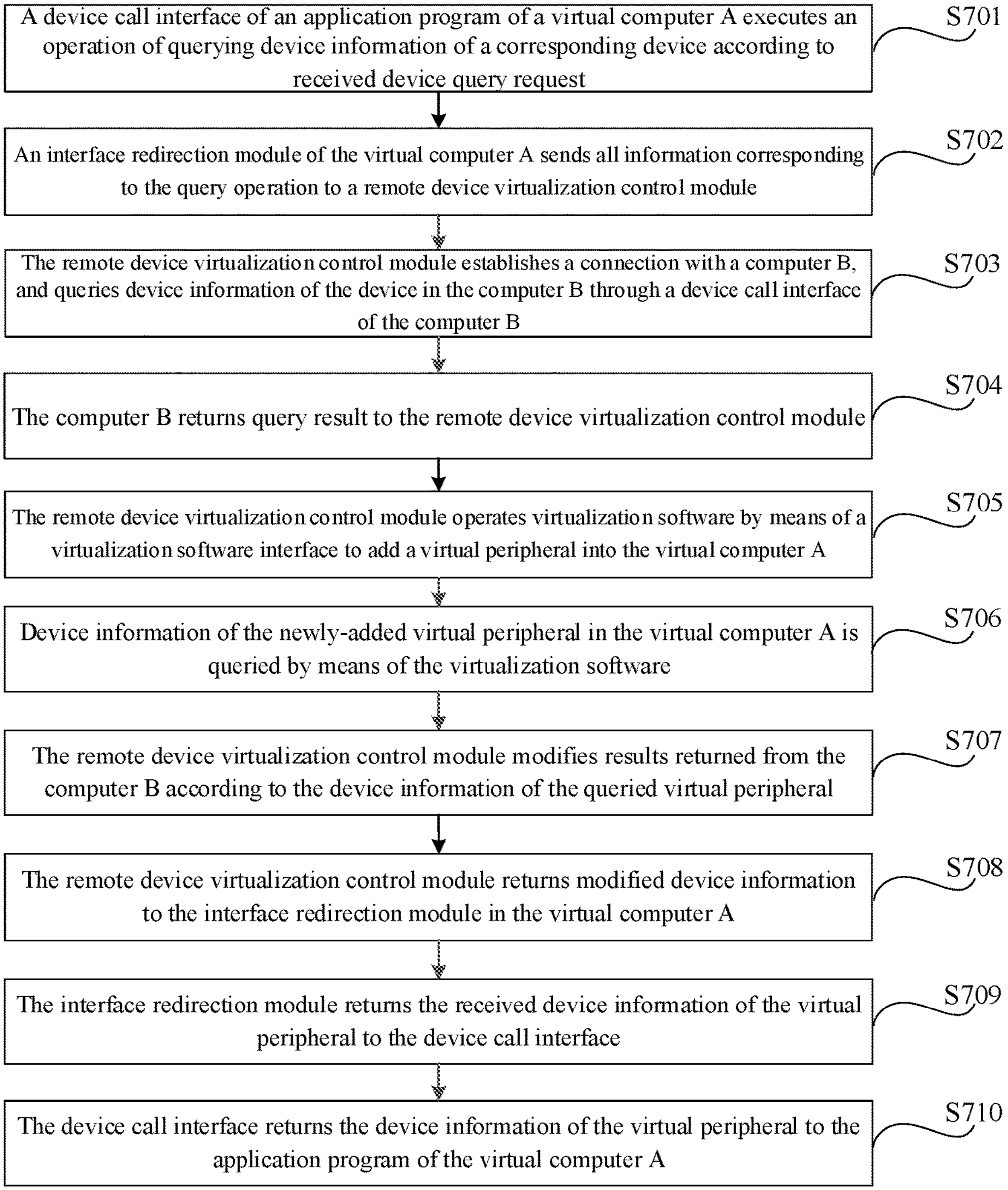
FIG. 7 is a flowchart of a method for acquiring device information shown in another example of the present disclosure with a structure shown in FIG. 6 as an example.

Specifically, with reference to FIGS. 6 and 7, the method for acquiring device information in the example of the present disclosure may include:

S701, a device call interface of an application program of the virtual computer A executes an operation of querying device information of a corresponding device according to received device query request.

S702, the interface redirection module of the virtual computer A sends all information corresponding to the query operation to the remote device virtualization control module.

S703, the remote device virtualization control module establishes a connection with the computer B, and queries device information of the device in the computer B by a device call interface of the computer B.

S704, the computer B returns a query result to the remote device virtualization control module.

S705, the remote device virtualization control module operates the virtualization software by means of the virtualization software interface to add a virtual peripheral into the virtual computer A.

S706, device information of the newly-added virtual peripheral in the virtual computer A is queried by means of the virtualization software.

S707, the remote device virtualization control module modifies the result returned from the computer B according to device information of the queried virtual peripheral.

S708, the remote device virtualization control module returns modified device information to the interface redirection module in the virtual computer A.

S709, the interface redirection module returns the received device information of the virtual peripheral to the device call interface.

S710, the device call interface returns the device information of the virtual peripheral to the application program of the virtual computer A.

That is, in the example of the present disclosure, in the virtualized scene, the device information of the peripheral in the second terminal may be queried first, then the virtual peripheral that is the same as the peripheral in the second terminal is added into the first terminal according to the device information of the peripheral in the second terminal, the virtual peripheral is taken as the target peripheral so as to return the device information of the virtual peripheral to the application program of the first terminal, in this way, when the application program queries the system device information through the operating system interface, since the virtual peripheral exists in the first terminal, the corresponding device distribution information may be queried, avoiding the execution error of the application program and ensuring normal running of the application program.

According to the above manner of determining the target peripheral, no matter whether the virtual peripheral that is the same as the peripheral in the second terminal exists in the first terminal, the new virtual peripheral is added, and then the new virtual peripheral is taken as the target peripheral, which may cause the virtual peripheral to occupy much storage space, influencing overall performance of the computer system. In one possible implementation, in order to avoid the above problem, whether the target peripheral that is the same as the peripheral in the second terminal exists in the first terminal may be firstly determined, and then the virtual peripheral that is the same as the peripheral in the second terminal is added into the first terminal according to the device information of the peripheral in the second terminal under the condition that the target peripheral that is the same as the peripheral in the second terminal does not exist in the first terminal.

In one example, whether the target peripheral that is the same as the peripheral in the second terminal exists in the first terminal may be determined according to information carried by the device query request, for example, the type information described above, etc., which is not limited by the example of the present disclosure.

It should be understood that how to determine whether the target peripheral that is the same as the peripheral in the second terminal exists in the first terminal is merely illustrative above. During the specific implementation of the present disclosure, whether the target peripheral that is the same as the peripheral in the second terminal exists in the first terminal may be determined by means of other manners, for example, one-to-one correspondence relationships between all peripherals in the first terminal and all peripherals in the second terminal are established in advance, that is, each peripheral in the second terminal may determine the same or similar peripheral in the first terminal, and then determine, in the first terminal, the target peripheral that is the same as the peripheral in the second terminal according to identification information of the peripheral in the second terminal included in the query request and the corresponding relationships, etc. The example of the present disclosure does not limit the manner of determining whether the target peripheral that is the same as the peripheral in the second terminal exists in the first terminal.

By means of the above manner, for the virtualized scene, if the device query request includes the type information of the peripheral in the second terminal, the peripheral with the same device type as or the similar device type to the peripheral in the second terminal may be directly determined in the first terminal according to the type information. Or, whether the target peripheral that is the same as the peripheral in the second terminal exists in the first terminal may be determined according to the type information firstly, and then if the target peripheral that is the same as the peripheral in the second terminal does not exist in the first terminal, the virtual peripheral that is the same as the peripheral in the second terminal is added into the first terminal according to the device information of the peripheral in the second terminal, and the virtual peripheral is taken as the target peripheral if being added successfully, which has high flexibility and a wider application range.

In other possible situations, when adding the virtual peripheral into the first terminal, there may also be a situation where the addition fails. For example, when the peripheral is added into the first terminal by means of the virtualization software, the virtual peripheral may not be possibly added into the virtual computer A due to different supporting degrees of the virtualization software. In this situation, the target peripheral may be determined from existing peripherals of the first terminal. For example, in the scene shown in FIG. 5, the interface redirection module may determine that a certain existing peripheral in the virtual computer A as the target peripheral, and returns the device information of the existing peripheral to the device call interface, such that the device information queried by the application program through the device call interface is actually the device information of the existing peripheral in the virtual computer A, avoiding the situation that the corresponding device distribution information may not be queried, and ensuring normal running of the application program.

Figure 8:
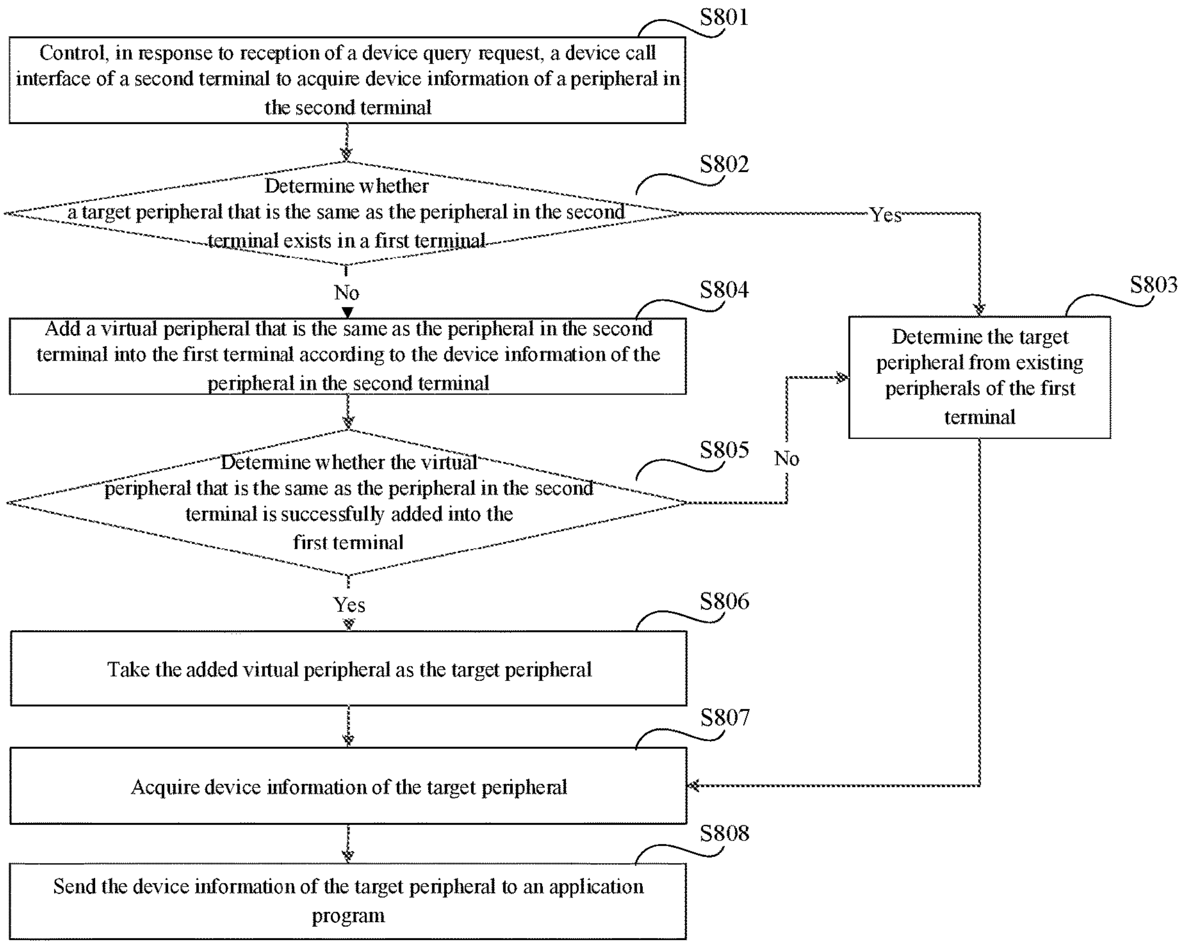
FIG. 8 is a flowchart of a method for acquiring device information shown in another example of the present disclosure.

With the first terminal as the virtual terminal as an example, a method for acquiring device information in the present disclosure will be illustrated by means of another example. With reference to FIG. 8, the method for acquiring device information may include:

S801, a device call interface of a second terminal is controlled to acquire device information of a peripheral in the second terminal in response to reception of a device query request.

S802, whether a target peripheral that is the same as the peripheral in the second terminal exists in a first terminal is determined, if yes, S803 is executed, otherwise, S804 is executed.

S803, the target peripheral is determined from existing peripherals of the first terminal.

S804, a virtual peripheral that is the same as the peripheral in the second terminal is added into the first terminal according to the device information of the peripheral in the second terminal.

S805, whether the virtual peripheral that is the same as the peripheral in the second terminal is successfully added into the first terminal is determined, if yes, S806 is executed, otherwise, S803 is executed.

S806, the added virtual peripheral is taken as the target peripheral.

S807, device information of the target peripheral is acquired.

S808, the device information of the target peripheral is sent to an application program.

The specific implementation of each above step has been illustrated in detail above, which is not described any more. In addition, it should be understood that the above examples of the method are expressed as combinations of a series of actions for simplicity of description, but it should be understood by those skilled in the art that the present disclosure is not limited by the order of the actions described above. Secondly, it should also be understood by those skilled in the art that the examples describe above belong to the preferred examples and the steps involved are not necessarily required by the present disclosure.

By means of the above method for acquiring device information, since the device information of the target peripheral in the first terminal is returned to the application program, so if the application program queries the device distribution information through the operating system interface, the corresponding device distribution information may be queried, avoiding the execution error of the application program and ensuring normal running of the application program.

Figure 9:
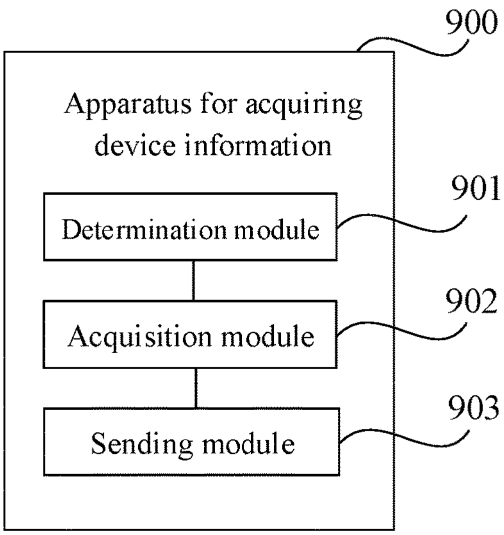
FIG. 9 is a block diagram of an apparatus for acquiring device information shown in another example of the present disclosure.

On the basis of the same inventive concept, the example of the present disclosure further provides an apparatus for acquiring device information. The apparatus is applied to a first terminal, and may be part or all of the first terminal by means of hardware, software or the combination of the two, and an application program in the first terminal may communicate with a peripheral in a second terminal through a device call interface. With reference to FIG. 9, the apparatus for acquiring device information 900 in the example of the present disclosure may include:

a determination module 901, configured to determine, in response to reception of a device query request, a target peripheral in the first terminal according to a preset rule, and the device query request is used for querying device information of a peripheral in the second terminal;

an acquisition module 902, configured to acquire device information of the target peripheral; and a sending module 903, configured to send the device information of the target peripheral to the application program.

In an example, the first terminal is a virtual terminal and is in communication connection with a device call interface of the second terminal, and the determination module 901 includes:

a control sub-module, configured to control the device call interface of the second terminal to acquire device information of the peripheral in the second terminal;

an addition sub-module, configured to add a virtual peripheral that is the same as the peripheral in the second terminal into the first terminal according to the device information of the peripheral in the second terminal; and a first determination sub-module, configured to take the virtual peripheral as the target peripheral if the virtual peripheral that is the same as the peripheral in the second terminal is successfully added into the first terminal.

In an example, the apparatus 900 further includes:

a second determination sub-module, configured to determine the target peripheral from existing peripherals of the first terminal if the virtual peripheral that is the same as the peripheral in the second terminal is not successfully added into the first terminal.

In an example, the addition sub-module is configured to:

determine whether the target peripheral that is the same as the peripheral in the second terminal exists in the first terminal; and add the virtual peripheral that is the same as the peripheral in the second terminal into the first terminal according to the device information of the peripheral in the second terminal under the condition that the target peripheral that is the same as the peripheral in the second terminal does not exist in the first terminal.

In an example, the query request includes type information of the peripheral in the second terminal, and the type information is used for representing a device type of the peripheral in the second terminal, and the determination module 901 is configured to:

analyze the query request to obtain the device type of the peripheral in the second terminal; and determine, in the first terminal, the target peripheral with the same device type as the peripheral in the second terminal.

With respect to the apparatus of the above example, a specific implementation in which each module performs an operation has been described in detail in the examples of the method, and will not be illustrated in detail herein.

By means of any apparatus for acquiring device information above, since the device information of the target peripheral in the first terminal is returned to the application program, so when the application program queries device distribution information through an operating system interface, the corresponding equipment distribution information may be queried, avoiding an execution error of the application program and ensuring normal operation of the application program.

On the basis of the same inventive concept, the example of the present disclosure further provides an electronic device. The electronic device includes:

a memory storing a computer program thereon; and a processor configured to execute the computer program in the memory so as to implement steps of any method for acquiring device information.

Figure 10:
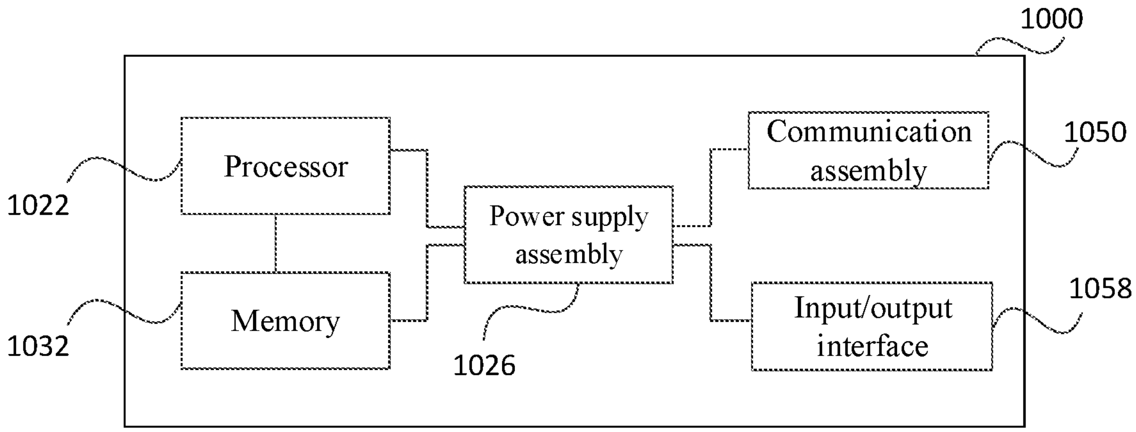
FIG. 10 is a block diagram of an electronic device shown in another example of the present disclosure.

In one possible implementation, a block diagram of the electronic device may be shown in FIG. 10. With reference to FIG. 10, the electronic device 1000 may be provided as a server. With reference to FIG. 10, the electronic device 1000 includes: the processor 1022, which may be one or more in number; and the memory 1032 used for storing the computer program executable by the processor 1022. The computer program stored in the memory 1032 may include one or more modules, each corresponding to a set of instructions. In addition, the processor 1022 may be configured to execute the computer program, so as to execute the method for acquiring device information.

In addition, the electronic device 1000 may further include a power supply assembly 1026 and a communication assembly 1050. The power supply assembly 1026 may be configured to execute power management of the electronic device 1000, and the communication assembly 1050 may be configured to achieve a communication of the electronic device 1000, for example, a wired or wireless communication. In addition, the electronic device 1000 may further include an input/output (I/O) interface 1058. The electronic device 1000 may operate an operating system stored in the memory 1032, for example, Windows Server™, Mac OS X™, Unix™, Linux™, etc.

In another example, a computer-readable storage medium including a program instruction is further provided. The program instruction implements steps of the method for acquiring device information when executed by a processor. For example, the computer-readable storage medium may be a memory 1032 including the program instruction, where the above program instruction may be executed by the processor 1022 of the electronic device 1000 so as to implement the method for acquiring device information.

The preferred implementations of the present disclosure are described in detail above with reference to the drawings. However, the present disclosure is not limited to the specific details of the above implementations, and various simple variations may be made to the technical solutions of the present disclosure within the scope of the technical concept of the present disclosure, and these simple variations fall within the scope of protection of the present disclosure.

In addition, it should be noted that the various specific technical features described in the above specific implementations may be combined in any suitable manner without contradiction, and in order to avoid unnecessary repetition, various possible combinations will not be separately illustrated any more in the present disclosure.

In addition, the various implementations of the present disclosure may also be arbitrarily combined, and should also be regarded as the content disclosed in the present disclosure as long as it does not depart from the idea of the present disclosure.

What is claimed is:

1. A method for acquiring device information, performed by a first terminal for avoiding execution error of an application program in a scene of cross-terminal calling remote device, the first terminal comprising a device call interface and an interface redirection module, an application program in the first terminal is in telecommunication with a peripheral in a second terminal through the device call interface, and the method comprising:

determining, by the interface redirection module in response to the device call interface receiving a device query request, a target peripheral in the first terminal according to a preset rule, wherein the device query request is used for querying device information of the peripheral in the second terminal, the device information comprises dynamic information changed in different computer systems, and the dynamic information comprises a bus address and a device address;

acquiring, by the device call interface, device information of the target peripheral returned by the interface redirection module to the device call interface; and sending, by the device call interface, the device information of the target peripheral to the application program, wherein the device information of the target peripheral is used by the application program to query device distribution information so as to execute a computation task;

wherein the first terminal is a virtual terminal and is in communication connection with a device call interface of the second terminal, the first terminal further comprises a remote device virtualization control module and a virtualization software interface; and determining, by the interface redirection module, the target peripheral in the first terminal according to the preset rule comprises:

intercepting, by the interface redirection module, a query operation executed by the device call interface according to the device query request, and sending, by the interface redirection module, information corresponding to the query operation to the remote device virtualization control module;

controlling, by the remote device virtualization control module, the device call interface of the second terminal to acquire device information of the peripheral in the second terminal;

operating, by the remote device virtualization control module, the virtualization software through the virtualization software interface to add a virtual peripheral that is the same as the peripheral in the second terminal into the first terminal according to the device information of the peripheral in the second terminal; and taking, by the interface redirection module, the virtual peripheral as the target peripheral under the condition that the virtual peripheral that is the same as the peripheral in the second terminal is successfully added into the first terminal.

2. The method according to claim 1, further comprising:

determining, by the interface redirection module, the target peripheral from existing peripherals of the first terminal under the condition that the virtual peripheral that is the same as the peripheral in the second terminal is not successfully added into the first terminal.

3. The method according to claim 1, wherein operating, by the remote device virtualization control module, the virtualization software through the virtualization software interface to add the virtual peripheral that is the same as the peripheral in the second terminal into the first terminal according to the device information of the peripheral in the second terminal comprises:

determining, by the remote device virtualization control module, whether the target peripheral that is the same as the peripheral in the second terminal exists in the first terminal; and operating, by the remote device virtualization control module, the virtualization software through the virtualization software interface to add the virtual peripheral that is the same as the peripheral in the second terminal into the first terminal according to the device information of the peripheral in the second terminal under the condition that the target peripheral that is the same as the peripheral in the second terminal does not exist in the first terminal.

4. The method according to claim 1, wherein the device query request comprises type information of the peripheral in the second terminal, the type information is used for representing device type of the peripheral in the second terminal, and determining, by the interface redirection module, the target peripheral in the first terminal according to the preset rule comprises:

analyzing, by the remote device virtualization control module, the device query request to obtain the device type of the peripheral in the second terminal; and determining, by the interface redirection module, the target peripheral in the first terminal with the same device type as the peripheral in the second terminal.

5. A non-transitory computer-readable storage medium storing a computer program thereon, wherein the computer program implements a method for acquiring device information when executed by a processor of a first terminal, the method for acquiring device information is used for avoiding execution error of an application program in a scene of cross-terminal calling remote device, the first terminal comprising a device call interface and an interface redirection module, an application program in the first terminal is in telecommunication with a peripheral in a second terminal through the device call interface, and the method comprises:

determining, by the interface redirection module in response to the device call interface receiving a device query request, a target peripheral in the first terminal according to a preset rule, the device query request is used for querying device information of the peripheral in the second terminal, the device information comprises dynamic information changed in different computer systems, and the dynamic information comprises a bus address and a device address;

acquiring, by the device call interface, device information of the target peripheral returned by the interface redirection module to the device call interface; and sending, by the device call interface, the device information of the target peripheral to the application program, wherein the device information of the target peripheral is used by the application program to query device distribution information so as to execute a computation task;

wherein the first terminal is a virtual terminal and is in communication connection with a device call interface of the second terminal, the first terminal further comprises a remote device virtualization control module and a virtualization software interface; and determining, by the interface redirection module, the target peripheral in the first terminal according to the preset rule comprises:

intercepting, by the interface redirection module, a query operation executed by the device call interface according to the device query request, and sending, by the interface redirection module, information corresponding to the query operation to the remote device virtualization control module;

controlling, by the remote device virtualization control module, the device call interface of the second terminal to acquire device information of the peripheral in the second terminal;

operating, by the remote device virtualization control module, the virtualization software through the virtualization software interface to add a virtual peripheral that is the same as the peripheral in the second terminal into the first terminal according to the device information of the peripheral in the second terminal; and taking, by the interface redirection module, the virtual peripheral as the target peripheral under the condition that the virtual peripheral that is the same as the peripheral in the second terminal is successfully added into the first terminal.

6. An electronic device, comprising:

a memory storing a computer program thereon; and a processor configured to execute the computer program in the memory so as to implement a method for acquiring device information, wherein the method for acquiring device information is used for avoiding execution error of an application program in a scene of cross-terminal calling remote device, the electronic device is taken as a first terminal, the first terminal comprising a device call interface and an interface redirection module, an application program in the first terminal is in telecommunication with a peripheral in a second terminal through the device call interface, and the method comprises:

determining, by the interface redirection module in response to the device call interface receiving a device query request, a target peripheral in the first terminal according to a preset rule, the device query request is used for querying device information of the peripheral in the second terminal, the device information comprises dynamic information changed in different computer systems, and the dynamic information comprises a bus address and a device address;

acquiring, by the device call interface, device information of the target peripheral returned by the interface redirection module to the device call interface; and sending, by the device call interface, the device information of the target peripheral to the application program, wherein the device information of the target peripheral is used by the application program to query device distribution information so as to execute a computation task;

wherein the first terminal is a virtual terminal and is in communication connection with a device call interface of the second terminal, the first terminal further comprises a remote device virtualization control module and a virtualization software interface; and determining, by the interface redirection module, the target peripheral in the first terminal according to the preset rule comprises:

intercepting, by the interface redirection module, a query operation executed by the device call interface according to the device query request, and sending, by the interface redirection module, information corresponding to the query operation to the remote device virtualization control module;

controlling, by the remote device virtualization control module, the device call interface of the second terminal to acquire device information of the peripheral in the second terminal;

operating, by the remote device virtualization control module, the virtualization software through the virtualization software interface to add a virtual peripheral that is the same as the peripheral in the second terminal into the first terminal according to the device information of the peripheral in the second terminal; and taking, by the interface redirection module, the virtual peripheral as the target peripheral under the condition that the virtual peripheral that is the same as the peripheral in the second terminal is successfully added into the first terminal.

7. The medium according to claim 5, wherein the method further comprises:

determining, by the interface redirection module, the target peripheral from existing peripherals of the first terminal under the condition that the virtual peripheral that is the same as the peripheral in the second terminal is not successfully added into the first terminal.

8. The medium according to claim 5, wherein operating, by the remote device virtualization control module, the virtualization software through the virtualization software interface to add the virtual peripheral that is the same as the peripheral in the second terminal into the first terminal according to the device information of the peripheral in the second terminal comprises:

determining, by the remote device virtualization control module, whether the target peripheral that is the same as the peripheral in the second terminal exists in the first terminal; and operating, by the remote device virtualization control module, the virtualization software through the virtualization software interface to add the virtual peripheral that is the same as the peripheral in the second terminal into the first terminal according to the device information of the peripheral in the second terminal under the condition that the target peripheral that is the same as the peripheral in the second terminal does not exist in the first terminal.

9. The medium according to claim 5, wherein the device query request comprises type information of the peripheral in the second terminal, the type information is used for representing device type of the peripheral in the second terminal, and determining, by the interface redirection module, the target peripheral in the first terminal according to the preset rule comprises:

analyzing, by the remote device virtualization control module, the device query request to obtain the device type of the peripheral in the second terminal; and determining, by the interface redirection module, the target peripheral in the first terminal with the same device type as the peripheral in the second terminal.

10. The electronic device according to claim 6, wherein the method further comprises:

determining, by the interface redirection module, the target peripheral from existing peripherals of the first terminal under the condition that the virtual peripheral that is the same as the peripheral in the second terminal is not successfully added into the first terminal.

11. The electronic device according to claim 6, wherein operating, by the remote device virtualization control module, the virtualization software through the virtualization software interface to add the virtual peripheral that is the same as the peripheral in the second terminal into the first terminal according to the device information of the peripheral in the second terminal comprises:

determining, by the remote device virtualization control module, whether the target peripheral that is the same as the peripheral in the second terminal exists in the first terminal; and operating, by the remote device virtualization control module, the virtualization software through the virtualization software interface to add the virtual peripheral that is the same as the peripheral in the second terminal into the first terminal according to the device information of the peripheral in the second terminal under the condition that the target peripheral that is the same as the peripheral in the second terminal does not exist in the first terminal.

12. The electronic device according to claim 6, wherein the device query request comprises type information of the peripheral in the second terminal, the type information is used for representing device type of the peripheral in the second terminal, and determining, by the interface redirection module, the target peripheral in the first terminal according to the preset rule comprises:

analyzing, by the remote device virtualization control module, the device query request to obtain the device type of the peripheral in the second terminal; and determining, by the interface redirection module, the target peripheral in the first terminal with the same device type as the peripheral in the second terminal.

* * * * *